United States Patent [19]
Werz et al.

[11] 3,815,981
[45] June 11, 1974

[54] MOTION PICTURE CAMERA WITH FADING MEANS
[75] Inventors: Siegfried Werz, Munich; Johann Zanner, Jr., Unterhaching, both of Germany
[73] Assignee: Agfa-Gevaert Aktiengesellschaft, Leverkusen, Germany
[22] Filed: Sept. 22, 1972
[21] Appl. No.: 291,390

[30] Foreign Application Priority Data
Sept. 25, 1971 Germany.......................... 2148028

[52] U.S. Cl. ............................................. 352/91 S
[51] Int. Cl. .......................................... G03b 21/36
[58] Field of Search................................... 352/91 S

[56] References Cited
UNITED STATES PATENTS

| | | | |
|---|---|---|---|
| 3,419,325 | 12/1968 | Mayr et al. | 352/91 S |
| 3,582,198 | 6/1971 | Reinsch | 352/91 |
| 3,689,137 | 9/1972 | Iida | 351/91 |
| 3,692,395 | 9/1972 | Iida | 351/91 |
| 3,712,720 | 1/1973 | Winkler et al. | 352/91 S |

FOREIGN PATENTS OR APPLICATIONS
1,949,891   2/1971   Germany ............................ 352/91

Primary Examiner—Samuel S. Matthews
Assistant Examiner—Russell E. Adams, Jr.
Attorney, Agent, or Firm—Michael S. Striker

[57] ABSTRACT

A motion picture camera wherein only a predetermined portion of that section of motion picture film which is being transported forwardly while the takeup reel is held against any rotation is exposed with fade-out effect. The film portion is thereupon transported rearwardly in automatic response to completion of exposures with fade-out effect and is ready to be exposed again but with fade-in effect. The difference between the lengths of the forwardly transported film section and the film portion which is exposed first with fade-out effect and is thereupon transported rearwardly is selected with a view to insure that the claw pull-down can skip one or more film frames during forward transport preparatory to the making of exposures with fade-out effect so that the number of frames which are exposed with fade-out effect invariably equals that number of frames which are selected in advance for rearward transport in response to completion of exposures with fade-out effect.

9 Claims, 1 Drawing Figure

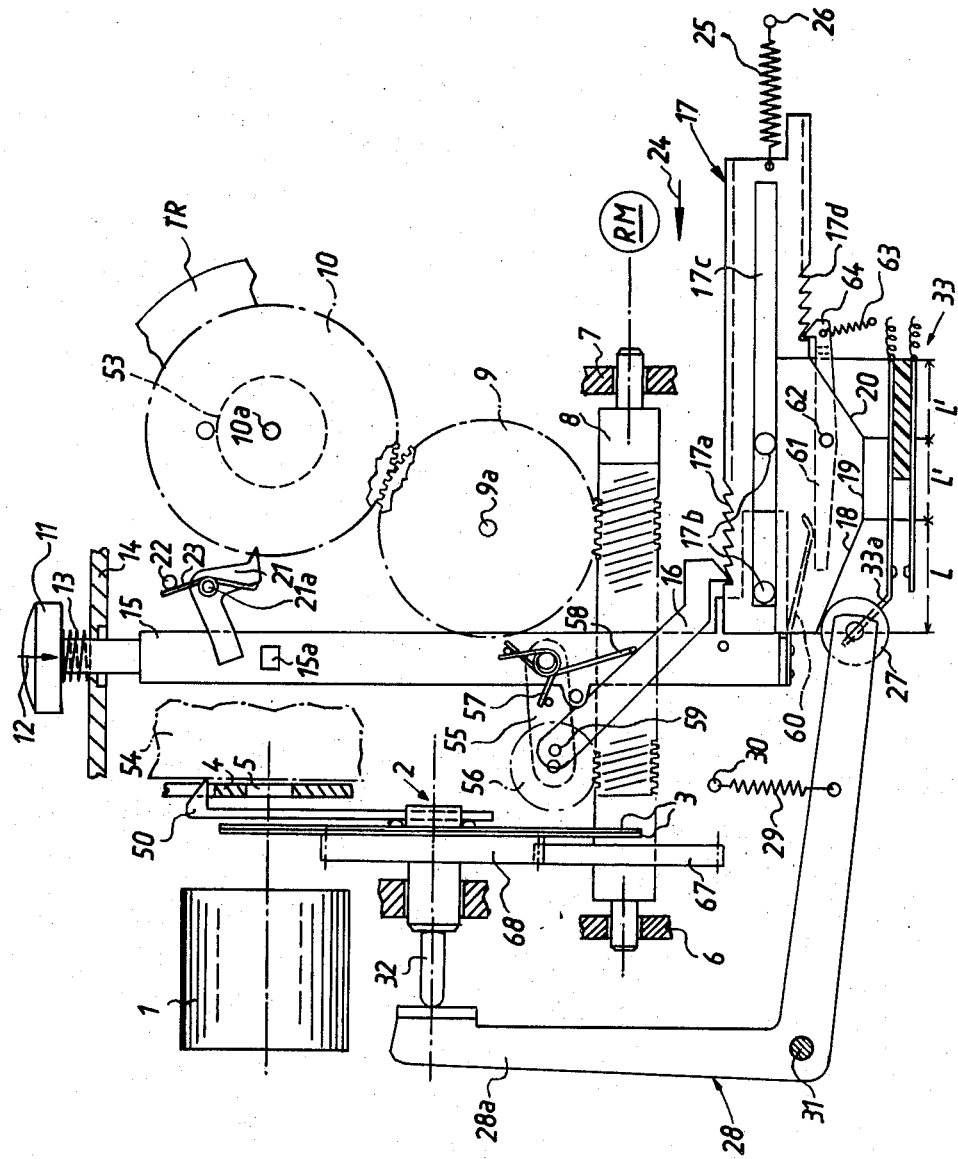

MOTION PICTURE CAMERA WITH FADING MEANS

BACKGROUND OF THE INVENTION

The present invention relates to improvements in fading means for motion picture cameras. More particularly the invention relates to improvements in a motion picture camera which is provided with fading means and utilizes takeup reels of the type which cannot be rotated in a direction to pay out the film. Consequently, the takeup reels of such cameras must be arrested during the making of exposures with fade-out effect in order to make sure that the frames which were exposed with fade-out effect cannot be collected by the takeup reel. The invention also relates to a novel and improved method of operating the camera during the making of exposures with fade-out effect and fade-in effect.

It is well known that certain types of motion picture film are stored in cassettes or cartridges containing a takeup reel which can rotate in a single direction, namely, in a direction to collect the film. Therefore, the fading means of cameras which utilize such cartridges must be provided with a blocking device which prevents any rotation of the takeup reel during the making of exposures with fade-out effect. This will be readily understood since, once a film portion is collected by the core of the takeup reel, such portion cannot be transported rearwardly for the purpose of exposing it again to scene light (with fade-in effect) because the takeup reel cannot rotate in a direction to pay out the film. Such cameras are provided with a reversible film transporting mechanism which normally comprises a claw pull-down (also called intermittent) which is actuatable by a reversible electric motor and can transport the film forwardly during the making of normal exposures, during the making of exposures with fade-out effect, and during the making of exposures with fade-in effect, and which can transport the film rearwardly prior ro the making of exposures with fade-in effect but following the making of exposures with fade-out effect. The arrangement is preferably such that the direction of film transport is reversed in automatic response to completion of a predetermined number of exposures with fade-out effect whereby the pull-down transports rearwardly those film frames which were exposed with fade-out effect. The cartridges which accommodate takeup reels mounted for rotation only in a direction to collect the film are normally large enough to be capable of storing that portion of film which was exposed with fade-out effect while the takeup reel was held against rotation in any direction. Such portion of film is simply looped in the interior of the cartridge and is ready to be transported rearwardly as soon as the camera has completed the exposure of a predetermined number of film frames with fade-out effect. The situation is similar if the takeup reel is not stored in the interior of a cartridge. The housing of the motion picture camera is then designed to provide sufficient room for the looped portion of motion picture film which was exposed with fade-out effect and accummulates downstream of the film gate. The number of film frames which are to be exposed with fade-out effect and which are to be thereupon transported rearwardly prior to renewed exposure to scene light (but with fade-in effect) is determined in advance by the fading mechanism of the camera.

It was found that, during the looping of that portion of motion picture film which is being exposed with fade-out effect, (during such operation of the film transporting mechanism, the takeup reel is at a standstill and the film is being transported only by the pull-down), the film is likely to assume a position in which it cannot be reached by the claw of the pull-down. Consequently the pull-down is likely to skip one or more perforations in the looped motion picture film so that the number of film frames which are exposed with fade-out effect is actually less than the preselected number. Since the fading mechanism of the camera is set to effect a rearward transport of a predetermined number of film frames which were assumed to have been exposed with fade-out effect, such skipping of one or more perforations by the claw of the pull-down is likely to result in excessive stressing of film during rearward transport (preparatory to making of exposures with fade-in effect) and in eventual tearing of film in the region of its perforations. This will be readily understood since the pull-down continues to operate in reverse after it has completed the rearward transport of those film frames which were previously exposed with fade-out effect. Consequently, if the number of once exposed film frames is less than the number which is selected by the fading mechanism, the pull-down is likely to damage the film or to suffer damage in response to excessive stressing of the film. The width of the passage wherein the film is being guided during movement along the pull-down cannot be reduced beyond a certain value so that the looping of film is likely to result in such positioning of film in the region of the claw that the pull-down is simply incapable of entering the adjoining perforations during certain of its forward strokes (during the making of exposures with fade-out effect and while the takeup reel is held against rotation in a direction to collect the film).

SUMMARY OF THE INVENTION

An object of the invention is to provide a novel and improved method of operating a motion picture camera during the making of effect shots of the type known as exposures with fade-out effect and/or fade-in effect.

Another object of the invention is to provide a motion picture camera with a novel and improved fading mechanism which is not likely to damage the film or to cause damage to the film transporting mechanism or other camera units during the rearward transport of those film frames which were exposed with fade-out effect.

A further object of the invention is to provide a fading mechanism for motion picture cameras with novel and improved programming means which insures that the length of that portion of motion picture film which is exposed with fade-out effect at least equals that length which is selected in advance by the setting of the fading mechanism so that the film cannot be damaged during rearward transport subsequent to completion of exposures with fade-out effect.

Still another object of the invention is to provide a motion picture camera with a simple, compact, rugged and inexpensive fading mechanism which can be operated by beginners or by advanced photographers, which can be used in popularly priced or in expensive motion picture cameras and which invariably insures that all film frames which were exposed with fade-out effect can be exposed again but with fade-in effect.

One feature of the invention resides in the provision of a method of operating a motion picture camera wherein the film is being withdrawn from a supply reel which may but need not be mounted in a cartridge or cassette and is being collected by a driven takeup reel during the making of normal exposures. The method comprises the steps of withdrawing from the supply reel an elongated section of motion picture film and exposing a portion of such section to scene light with fade-out effect, simultaneously holding the takeup reel against rotation in a direction to collect the film, transporting the film portion rearwardly without exposure to scene light (for example, by completely closing the shutter), transporting the film portion forwardly, and simultaneously exposing the film portion to scene light with fade-in effect.

The number of film frames in the film section which is being transported forwardly exceeds the number of film frames in the portion of the film section by $m$ wherein $m$ is a whole number including one. The first transporting step preferably takes place in automatic response to completion of the withdrawing step so that the operator of the camera need not be concerned with the rearward transport of those film frames which were exposed with fade-out effect.

The novel features which are considered as characteristic of the invention are set forth in particular in the appended claims. The improved motion picture camera and its fading mechanism itself, however, both as to their construction and mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary diagrammatic partly elevational and partly sectional view of a motion picture camera embodying a fading mechanism which is constructed and assembled in accordance with the present invention.

DESCRIPTION OF THE PREFERRED EMBODIMENTS

The drawing illustrates diagrammatically a portion of a motion picture camera which comprises a picture taking lens 1, an adjustable diaphragm 2 having blades 3 movable relative to each other to define a light-admitting aperture of variable size, a film guide 4 which is provided with a light-admitting opening 5, and a prime mover including a reversible electric motor RM which can drive a worm shaft 8 mounted in bearings 6 and 7. The shutter 2 constitutes the light-controlling means of the fading mechanism which further includes a reciprocable programming slide 17 and a knob 11 forming part of actuating means for the programming slide 17. The film transporting mechanism comprises a conventional claw pull-down 50 which can transport motion picture film forwardly (namely, downwardly as viewed in the drawing) and rearwardly. The operative connection between the reversible electric motor RM or the worm shaft 8 and the pull-down 50 is of conventional design and, therefore, is not shown in the drawing. The worm shaft 8 can drive a takeup reel TR in a direction to collect the film by way of a worm gear 9 (which meshes with the worm of the shaft 8 and is mounted on a shaft 9a) and a second gear 10 which is mounted on a shaft 10a. The manner in which the takeup reel TR is held against rotation in a direction to pay out the film is known in the art and is not shown in the drawing. In normal operation, the pull-down 50 transports the film stepwise by drawing it from a supply reel, and the thus withdrawn film is collected by the takeup reel TR. The takeup reel TR and the supply reel (not shown) are preferably mounted in the interior of a suitable cassette or cartridge 54.

The aforementioned actuating knob 11 is accessible at the outer side of the camera housing 14 and is biased to the starting or idle position by a helical return spring 13. In order to start the operation of fading mechanism, the operator must depress the knob 11 in the direction indicated by arrow 12. The shank of the knob 11 is connected with a motion transmitting member or shifter 15 which can pivot a pawl 16 to the operative position shown in the drawing. The shifter 15 carries a pivotable lever 55 which supports a gear 56 movable into mesh with the worm of the shaft 8. A first torsion spring 57 biases the lever 55 in a counterclockwise direction, and a second torsion spring 58 biases the pawl 16 in a clockwise direction, as viewed in the drawing. The pawl 16 is turnable on an eccentric pin 59 of the gear 56.

The programming slide 17 has a first row of teeth 17a and a second row of teeth 17d. When the knob 11 is depressed against the opposition of the spring 13, the shifter 15 moves downwardly and causes the gear 56 to move into mesh with the worm of the shaft 8. The shaft 8 is driven by the motor RM so that the gear 56 rotates and causes the pallet of the pawl 16 to transport the slide 17 stepwise. For example, each revolution of the gear 56 can result in leftward movement of the slide 17 by a distance corresponding to the combined width of two teeth 17a.

The slide 17 has an elongated slot 17c for two guide pins 17b mounted in the housing 14. The lower end portion of the shifter 15 carries a leaf spring 60 which can pivot a retaining lever 61 mounted on a pivot pin 62 below the slide 17. A weak helical spring 63 biases the lever 61 in a clockwise direction, and the bias of the spring 63 is overcome by the spring 60 when the user of the camera depresses the knob 11 whereby a tooth 64 of the lever 61 engages the adjacent tooth 17d at the underside of the slide 17. The lever 61 then prevents a return movement of the slide 17 to the illustrated fade-out starting position under the action of a helical return spring 25. The latter is attached to the right-hand end portion of the slide 17 and to a post 26 in the housing 14. An arrow 24 indicates the direction of stepwise movement of the slide 17 by means of the pawl 16. When the pressure upon the knob 11 is relaxed or terminated, the spring 13 lifts the shifter 15 and the gear 56 is disengaged from the worm of the shaft 8. Also, the leaf spring 60 is disengaged from the lever 61 so that the spring 63 is free to contract and to disengage the tooth 64 from the adjacent tooth 17d. The spring 25 thereupon automatically returns the slide 17 to the illustrated starting position.

The lower portion of the slide 17, as viewed in the drawing, is provided with three mutually inclined cam faces 18, 19 and 20. The slide 17 is a functional equivalent of a rotary programming element of the type disclosed in the German Pat. No. 1,949,891. This slide is designed to regulate the operation of the camera during the making of exposures with fade-out effect, during rearward transport of those film frames which were exposed with fade-out effect, and also during the making of exposures with fade-in effect.

The motion picture camera further comprises a blocking pawl 21 which is mounted on a pivot pin 21a and is biased in a counterclockwise direction, as viewed in the drawing, by a torsion spring 23 which reacts against a stationary post 22. The left-hand arm of the pawl 21 normally abuts against a stop 15a on the shifter 15 so that the pallet on the other arm of the pawl 21 cannot reach the adjacent teeth of the gear 10. However, when the knob 11 is depressed in the direction indicated by arrow 12 (against the opposition of the return spring 13), the shifter 15 moves downwardly and lowers its stop 15a so that the spring 23 is free to turn the pawl 21 in a counterclockwise direction whereby the pallet of this pawl engages and holds the gear 10 against rotation in a direction to collect the film on the takeup reel TR. The gear 10 is held against rotation during the making of exposures with fade-out effect and also during the rearward transport of those film frames which were exposed with fade-out effect. The gear 9 preferably consists of two coaxial gear elements one of which meshes with the worm of the shaft 8 and the other of which meshes with the gear 10. When the gear 10 is held by the pawl 21, a clutch between the elements of the gear 9 allows the one gear element to rotate relative to the other gear element. This enables the motor RM to drive the shaft 8 when the gear 10 is held against rotation.

The drawing shows the fading mechanism in a position it assumes at the very start of a fading operation, i.e., immediately after depression of the knob 11. When the knob 11 is depressed, the pawl 16 moves its pallet into engagement with the teeth 17a of the programming slide 17 whereby the pawl 16 begins to move the slide 17 in the direction indicated by the arrow 24. This is due to eccentric mounting of pin 59 on the gear 56 which meshes with the worm on the shaft 8 when the knob 11 is depressed. The pawl 16 can move the slide 17 in a direction to the left, as viewed in the drawing, irrespective of whether the shaft 8 rotates in a clockwise or in a counterclockwise direction because the pawl 16 moves its pallet in and counter to the direction indicated by arrow 24 as soon as the gear 56 begins to rotate in either direction.

The cam faces 18, 19 and 20 of the slide 17 can be tracked by a roller follower 27 which is mounted on one arm of a bell crank 28. The bell crank 28 is mounted on a shaft 31 and its substantially horizontal arm is biased in a counterclockwise direction by a helical spring 29 which is attached to a stationary post 30. The upwardly extending arm 28a of the bell crank 28 can shift an adjusting pin 32 which can change the position of one shutter blade 3 relative to the other blade to thereby change the size of the light-admitting aperture which is defined by the shutter 2.

The shutter 2 is driven by gears 67, 68 which derive motion from the shaft 8.

The circuit of the reversible electric motor RM which drives the worm shaft 8 includes a normally open reversing switch 33. The upper contact of the switch 33 has an extension 33a which can be engaged by the cam face 19 to hold the reversing switch 33 in closed position whereby the motor RM rotates the worm shaft 8 in reverse and the latter operates the pull-down 50 in a direction to transport the film downwardly, as viewed in the drawing. When the roller follower 27 tracks the cam face 18 of the slide 17 while the slide moves in the direction indicated by the arrow 24, the bell crank 28 pivots in a clockwise direction and causes the shutter 2 to gradually reduce the size of its light-admitting aperture so that the camera makes exposures with fade-out effect. The making of such exposures is completed when the shutter 2 prevents entry of any scene light. This takes place while the cam face 19 closes the reversing switch 33 so that the motor RM drives the shaft 8 in reverse and the pull-down 50 transports rearwardly those film frames which were exposed with fade-out effect. The switch 33 opens automatically when the cam face 19 advances beyond the extension 33a. The roller follower 27 then tracks the cam face 20 and the bell crank 28 causes the shutter 2 to gradually increase the size of the light-admitting aperture so that the camera makes exposures with fade-in effect. The camera further comprises a suitable switch (not shown) which can be actuated by the bell crank 28 to arrest the motor RM as soon as the roller follower 27 reaches the cam face 19. The motor circuit is thereupon immediately completed in response to engagement of the extension 27 by the cam face 19 so that the motor RM starts to operate in reverse. The renewed starting of motor RM in forward direction when the cam face 19 moves beyond the extension 33a can be effected by depressing the customary camera release element (not shown).

In accordance with a feature of the present invention, the inclination and the length of the cam faces 18, 19 and 20 on the programming slide 17 (as considered in the direction indicated by the arrow 24) are such that the pull-down 50 transports toward the arrested takeup reel TR a film section which is longer than that portion which is to be exposed with fade-out effect. Thus, the length L of the cam face 18, as considered in the direction of the arrow 24, exceeds the length L' of the cam face 19 and the length L' of the cam face 20 by a predetermined value which may correspond to one or more film frames. For example, the length L can be selected in such a way that, when while the roller follower 27 tracks the cam face 18, the pull-down 50 transports forwardly 55 film frames while the gear 10 is held against rotation by the blocking pawl 21. The length L' of the cam face 19 or 20 is selected in such a way that the pull-down 50 thereupon transports rearwardly 45 (instead of 55) film frames. These numbers of the film frames are arbitrary and can be changed in response to replacement of the illustrated slide 17 with a differently configurated slide.

The just described design of the cam faces 18–20 on the programming slide 17 insures that the pull-down 50 can transport forwardly at least 45 film frames even if it happens to skip one or two perforations in the adjacent portion of the film. The skipping is most likely to occur immediately after the blocking pawl 21 engages the gear 10 to hold the takeup reel TR against rotation in a direction to collect the film. Therefore the pull-down 50 invariably advances at least 45 film frames which is sufficient for the making of a preselected number of exposures with fade-out effect. The initial pivoting of the bell crank 28 (during the interval which is required by the pull-down 50 to transport forwardly 10 film frames) does not result in any changes in the size of the aperture which is defined by the blades 3 of the shutter 2. Consequently, the exposures with fade-out effect are started only when the pull-down 50 performs that motion which is intended to advance the eleventh film frame following the depression of the knob 11. This insures that the pull-down 50 thereupon transports rearwardly only those film frames which were actually exposed with fade-out effect.

It was found that the improved fading mechanism is incapable of damaging the film and/or the film transporting mechanism. This is due to the fact that the length of that section of the film which is transported forwardly subsequent to depression of the knob 11 invariably exceeds the length of that portion which is actually exposed with fade-out effect and which is thereupon transported rearwardly in response to closing of the switch 33 by the cam face 19.

The drawing shows the takeup reel TR outside of the cassette 54. It is clear, however, that the takeup reel TR can be installed in the interior of the cassette, for example, in such a way that it is coaxial with the supply reel.

If the gear 9 is a one-piece gear, i.e., if the gear 10 must rotate in response to rotation of the shaft 8 and gear 9, the camera comprises a friction coupling 53 which is interposed between the gear 10 and takeup reel TR and the blocking pawl 21 is then arranged to directly engage and hold the takeup reel TR in response to depression of the knob 11. The latter remains depressed during the making of exposures with fade-out effect and during rearward transport of that portion of motion picture film which was exposed with fade-out effect.

The pawl 21 is preferably disengaged from the gear 10 or takeup reel TR during the making of exposures with fade-in effect so that the reel TR can collect the film portion which was exposed first with fade-out effect and thereupon with fade-in effect. This can be achieved by relaxing the pressure upon the knob 11 to such an extent that the stop 15a disengages the pawl 21 from the gear 10 or takeup reel TR but that the shaft 8 continues to drive the gear 56.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In a method of operating a motion picture camera wherein the film is being withdrawn from a source of supply and is being collected on a driven takeup reel during the making of normal exposures, the steps of withdrawing from the source of supply an elongated motion picture film section having a first length and exposing only a portion of said section having a second length smaller than said first length to scene light with fade-out effect; simultaneously holding the takeup reel against rotation in a direction to collect the film whereby said section of film is looped in the interior of the camera between the source of supply and the takeup reel; transporting said portion of said section rearwardly without exposure to scene light, damage to the film being avoided during such rearward transport by the existence of the differential between said first and second lengths; transporting said portion of said section forwardly and simultaneously exposing said portion which has previously been exposed with fade-out effect to scene light with fade-in effect; and simultaneously driving the takeup reel in a direction to collect said section of the film.

2. The steps as defined in claim 1, wherein the number of film frames in said section exceeds the number of film frames in said portion of said section by $m$ wherein $m$ is a whole number including one.

3. The steps as defined in claim 1, wherein said first transporting step takes place in automatic response to completion of said withdrawing step.

4. In a motion picture camera, a combination comprising a source of supply of motion picture film; a takeup reel rotatable in a direction to collect the film; reversible film transporting means arranged to transport the film forwardly from said source of supply toward said takeup reel during the making of normal exposures; and fading means including blocking means actuatable to hold said takeup reel against rotation in said direction, light-controlling means actuatable to expose the film to scene light with fade-out effect and fade-in effect, programming means for said light-controlling means and said film transporting means, and actuating means for said blocking means and said programming means, said programming means being arranged to maintain said transporting means in operation for an interval of time exceeding the interval during which said light-controlling means exposes the film with fade-out effect so that a section of film which is transported forwardly in response to actuation of said blocking means and said programming means has a first length exceeding a second length of a film portion of said section which is exposed with fade-out effect, said programming means being further arranged to effect a rearward transport of said portion of film upon completion of exposure with fade-out effect while said light-controlling means shields said portion of film against exposure to scene light so that the thus rearwardly transported portion of film is ready for exposure with fade-in effect, and damage to the film during the rearward transport is avoided by the existence of the differential between said first and second lengths.

5. A combination as defined in claim 4, wherein said programming means comprises cam means for regulating the operation of said light controlling means and said film transporting means.

6. A combination as defined in claim 4, wherein said programming means is reciprocable along a predetermined path.

7. A combination as defined in claim 4, further comprising common prime mover means for said film transporting means and said programming means.

8. A combination as defined in claim 4, wherein said film transporting means comprises a claw pull-down.

9. A combination as defined in claim 4, wherein said light-controlling means comprises an adjustable shutter.

* * * * *